United States Patent Office 3,772,309
Patented Nov. 13, 1973

3,772,309
METHOD FOR PREPARING 2-ARYLBENZAZOLES
Carl S. Marvel, Tucson, Ariz., Jerry G. Higgins, Bloomington, Ill., and Rolf Pense, Frankfurt-Hochst, Germany, assignors to Research Corporation, New York, N.Y.
No Drawing. Original application Feb. 7, 1969, Ser. No. 797,667, now Patent No. 3,630,972, dated Dec. 28, 1971. Divided and this application Apr. 7, 1971, Ser. No. 132,173
Int. Cl. C07d 49/38, 85/48, 91/44
U.S. Cl. 260—296 B  3 Claims

ABSTRACT OF THE DISCLOSURE 2-arylbenzazoles, i.e. 2-arylbenzimidazoles, 2-arylbenzoxazoles and 2-arylbenzthiazoles, are prepared by the condensation of an aromatic aldehyde bisulfite adduct with o-phenylenediamine, o-aminophenol and o-thiophenol, respectively.
Polybenzimidazoles, known polymers particularly useful in the fabrication of articles intended for use at elevated temperatures, are prepared by the condensation of aromatic tetraamines with aromatic dialdehyde bisbisulfite adducts.

This application is a divisional application of our application Ser. No. 797,667, filed Feb. 7, 1969, now U.S. Pat. 3,630,972.

This invention relates to an improved process for the preparation of 2-arylbenzazoles and polybenzimidazoles.
2-arylbenzazoles, i.e. 2-arylbenzimidazoles, 2-arylbenzoxazoles and 2-arylbenzthiazoles, have been prepared by the condensation of an aromatic aldehyde with o-phenylenediamine, o-aminophenol and o-thiophenol, respectively. However, poor yields of product are obtained.

Vogel and Marvel, J. Polymer Sci., 50, 511 (1961), originally prepared high molecular-weight polybenzimidazoles by the melt condensation of phenyl esters with aromatic tetraamines. While the cyclization of aromatic tetraamines with aromatic dialdehydes would appear promising for the preparation of polybenzimidazoles, adverse side reactions have prevented that reaction from being utilized for the intended purpose.

Aldehydines are obtained as a major by-product in the reaction of amines with aldehydes or acetals. It appears that the aldehydines originate from diimines formed in the initial stages of the reaction.

We have now discovered that the undesired side reactions and by-products which occur when an aldehyde or its acetal is condensed with an ortho-substituted aromatic diamine, aminophenol or aminothiophenol can be minimized by using the aldehyde bisulfite adduct as the reactant. Thus, excellent yields of 2-arylbenzazoles are obtained by the condensation of a 2-arylaldehyde with o-phenylenediamine, o-aminophenol or o-aminothiophenol in the presence of a solvent. Similarly, the condensation of aromatic tetraamines with aromatic dialdehyde bisbisulfite adducts can be used to prepare polybenzimidazoles. Excellent yields of polybenzimidazoles having inherent viscosities of 0.3–0.5 as measured in formic acid are obtained within reaction times of 3–5 hours; longer reaction times increase somewhat the inherent viscosity of the polymer product obtained.

More specifically, the present invention is a single-step process for the preparation of 2-arylbenzazoles of the formula

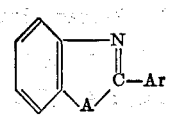

wherein A is O, S or NH and Ar is the residue of an aromatic aldehyde in one step which comprises condensing an aromatic aldehyde bisulfite adduct with o-phenylenediamine, o-aminophenol or o-thiophenol in the presence of a solvent. In another specific aspect, the present invention is a process for the preparation of polybenzimidazoles which comprises condensing an aromatic tetraamine with an aromatic dialydehyde bis-bisulfite adduct in the presence of a solvent. The amino groups of the carbocyclic tetraamine are ortho-paired to provide by reaction with each alde-hyde-bisulfite grouping the benzimidazole rings of the polymer.

It is important to note that use of bisulfite adducts as the aldehyde reactant gives excellent yields whereas use of the free aldehyde or acetal give extremely poor yields of the desired 2-arylbenzazole or polybenzimidazole. Diimine formation appears minimized and the desired ring closure is favored.

According to the process of the present invention, the reactants, generally in equivalent quantities, are refluxed together in a solvent. Polar solvents of high dielectric constant such as N,N-dimethylformamide (DMF), N,N-dimethylacetamide (DMAc), N - methyl - 2-pyrrolidone (MP), dimethylsulfoxide (DMSO) and the like are preferred. The quality of the polymer product obtained is improved by effecting at least the early stages of condensation in an inert atmosphere such as nitrogen. The polybenzimidazoles formed become somewhat insoluble in the reaction mixture as condensation proceeds and, when the reaction is completed, are isolated by evaporation of the solvent and/or precipitation by the addition of water.

The polybenzimidazole polymers obtained by the process of the present invention are characterized by a high degree of stability to oxidation at elevated temperatures. These polymers may be formed into fibers, cast as protective films or otherwise converted to shaped articles wherein their stability to elevated temperatures may be utilized. The fibers, generally in admixture with other fibers, may be woven or knit into fabrics resistant to the action of oxygen at elevated temperatures.

The present invention is further illustrated by means of the following non-limiting examples describing the preparation of 2-arylbenzazoles and polybenzimidazoles according to the process of the invention:

(1) 2-phenylbenzimidazole (A) From benzaldehyde and o-phenylenediamine.—Benzaldehyde (10.60 g., 0.10 mole) and o-phenylenediamine (10.80 g., 0.10 mole) were added to 100 ml. of DMF and refluxed in a nitrogen atmosphere for 2 hours. The reaction vessel was then opened to the air and the solution refluxed for 20 hours and then all but about 15–20 ml. of the DMF was distilled at 50–60 mm. pressure. Ethyle ether (50 ml.) was added and the mixture stirred for 30 minutes. The solid was separated by filtration and dried at 100° C. in vacuo overnight to give 6 g. (31%) of 2-phenylbenzimidazole as a cream colored product melting at 280–292° C. Concentration of the ether solution yield 1–3 g. of additional product.

(B) From benzaldehyde diethyl acetal and o-phenylenediamine.—Benzaldehyde diethyl acetal (18.00 g., 0.10 mole) and o-phenylenediamine (10.80 g., 0.10 mole) were added to 100 ml. DMF and refluxed in a nitrogen atmosphere for 2 hours. The reaction vessel was then opened to the air and refluxed for an additional 18 hours and then all but about 15–20 ml. of the DMF was removed by distillation at 50–60 mm. pressure. Ethyl ether (50 ml.) was added and the mixture stirred for 30 minutes. After filtering and drying 5 g. (26%) of 2-phenylbenzimidazole was obtained melting at 296–298° C. About 6 g. (31%) of product was obtained when 0.10 g. of trichloroacetic acid was present in the reaction mixture.

(C) From benzaldehyde bisulfite adduct and o-phenylenediamine.—Benzaldehyde bisulfite adduct (22.42 g., 0.107 mole) and o-phenylenediamine (11.56 g., 0.107 mole) were added to 100 ml. of DMF and the reaction mixture was heated at reflux for 15–20 minutes in a nitrogen atmosphere. The DMF was removed by distillation at reduced pressure, 50 ml. of water was added and the mixture stirred for 30 minutes. The solid was separated by filtration, washed twice with 20 ml. portions of water, and dried to give almost 19 g. (98%) of almost white 2-phenylbenzimidazole melting at 294–297° C.

(2) 2 - phenylbenzthiazole.—Benzaldehyde bisulfite adduct (4.48 g., 0.021 mole) and o-aminothiophenol (2.62 g., 0.021 mole) were added to 50 ml. DMAc and the reaction mixture refluxed for 30–45 minutes in a nitrogen atmosphere. The DMAc was removed by distillation at reduced pressure and 30 ml. of water was added. The reaction mixture was stirred for 30 minutes, filtered, the precipitate washed with two 20 ml. portions of water, and dried to give about 4 g. (91–94%) of 2-phenylbenzthiazole melting at 111–113° C.

(3) 2 - phenylbenzoxazole.—Benzaldehyde bisulfite adduct (4.48 g., 0.021 mole) and o-aminophenol (2.29 g., 0.021 mole) were added to 50 ml. DMAc and refluxed for 30 minutes in a nitrogen atmosphere. The reaction flask was then opened to the air and 0.9 g. of sulfur was added. The reaction mixture was refluxed for 8 hours and the DMAc removed by distillation at reduced pressure. About 30 ml. of water was added and the reaction mixture stirred until the product crystallized. The product was separated and dissolved in 100 ml. of ether. The ether solution was filtered and the solvent evaporated to yield about 3 g. (80–84%) of 2-phenylbenzoxazole. Sublimation gave white crystals melting at 104–105° C.

(4) 2 - pyridylbenzimidazole.—Picoline-2-carboxaldehyde bisulfite adduct (4.62 g., 0.021 mole) and o-phenylenediamine (2.27 g., 0.021 mole) were added to 50 ml. of DMAc and the reaction mixture refluxed for 40–50 minutes in a nitrogen atmosphere. The DMAc was removed by distillation at reduced pressure and 30 ml. of water added to the reaction mixture was stirred for 30 minutes, the preciptate separated by filtration and dried to yield about 3.8 g. (90–92%) of 2-pyridylbenzimidazole. Recrystallization from alcohol-water gave a product melting at 220–222° C.

(5) Isophthalaldehyde bis - bisulfite adduct.—Isophthalaldehyde (5.0 g., 0.037 mole) and sodium bisulfite (8.80 g., 0.085 mole) were added to a stirred solution of 500 ml. of methanol containing 75 ml. of water. The reaction mixture was stirred overnight at room temperature. The product was filtered and the filter cake pressed free of most of the solvent. After washing with 50–60 ml. of warm methanol, the solid product was filtered and dried in vacuo for 8 hours at 100° C. After drying, there was obtained 10.5 g. of isophthalaldehyde bis-bisulfite as a white solid melting above 300° C. The bis-bisulfite adducts of o-phthalaldehyde and terephthalaldehyde can be prepared in a similar manner.

(6) Polybenzimidazoles.—3,3′,4,4′-tetraaminodiphenyl (I) (0.6310 g., 0.00294 mole) and the isophthalaldehyde bis-busulfiite adduct (1.0388 g., 0.00304 mole) were added to 100 ml. of N,N-dimethylacetamide and refluxed for five hours in a nitrogen atmosphere. Some polymer precipitated during the course of the reaction. About two-thirds of the solvent was removed by distillation at 40–50 mm. pressure and the residual reaction mixture poured into 100 ml. of distilled water. A cream-colored solid precipitated and was separated by suction filtration. The polymer cake was washed thoroughly with 25 ml. portions of water and dried in vacuo at 160° C. for ten hours. A theoretical yield of poly-2,2′-(1,3-phenylene)-5,5′-bibenzimidazole (XI) was obtained having an inherent viscosity of 0.47 as measured in formic acid (generally 0.225–0.500 g./100 ml.). The ultraviolet and infrared spectra of this and the other polymers prepared below were substantially identical to those reported by Vogel and Marvel, J. Polymer, Sci., 50, 511 (1961).

A similar reaction of the isophthalaldehyde bis-bisulfite adduct with 3,3′,4′,4-tetraaminodiphenyl ether (II) gave a theoretical yield of poly-2,2′-(1,3-phenylene)-5,5′-bibenzimidazole ether (XII). Likewise, the reaction of isophthalaldehyde bis-bisulfite adduct with 1,2,4,5-tetraaminobenzene (III) gave a theoretical yield of poly-2,6-(1,3-phenylene)-m-benzobisimidazole (XIII). The reaction conditions employed and the results obtained in these and other related polymerizations are summarized below:

| Tetraamine | Solvent | Hours heated in nitrogen | Hours heated in air | Product | Inherent viscosity |
|---|---|---|---|---|---|
| I | DMF | 2 | 18 | XI | 0.34 |
|   | MP | 3 | 18 | XI | 0.29 |
|   | MP | 5 | 16 | XI | 0.33 |
|   | DMAc | 3 | 18 | XI | 0.45 |
|   | DMSO | 5 | 14 | XI | 0.51 |
| II | DMAc | 2 | 16 | XII | 0.38 |
|   | DMSO | 5 | 14 | XII | 0.55 |
| I | DMAc | 3 | 0 | XI | 0.31 |
|   | DMAc | 20 | 0 | XI | 0.42 |
|   | DMAc | 40 | 0 | XI | 0.52 |
| II | DMAc | 20 | 0 | XII | 0.38 |
| III | DMAc | 40 | 0 | XIII | 0.45 |

The above-offered examples are intended only to illustrate the process of the present invention. Variations in the process will suggest themselves to those skilled in the art and our invention is as claimed.

We claim:

1. In a process for preparing a 2-arylbenzazaloe of the formula:

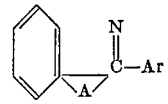

wherein A is O, S, or NH and Ar is phenyl or pyridyl by condensing benzaldehyde or picoline-2-carboxaldehyde or their bisulfite adducts with o-phenylenediamine, o-aminophenol or o-aminothiophenol, the improvement consisting essentially of conducting said condensation in a single step by refluxing equivalent molar quantities of the bisulfite adduct of said aldehyde and said amine in a polar solvent of high dielectric constant selected from the group consisting of N,N-dimethylformamide, N,N-dimethylacetamide, N-methyl-2-pyrrolidone and dimethylsulfoxide.

2. A process according to claim 1 wherein 2-phenylbenzimidazole is prepared by condensing benzaldehyde bisulfite adduct with o-phenylenediamine.

3. A process according to claim 1 wherein 2-pyridylbenzimidazole is prepared by condensing picoline-2-carboxaldehyde bisulfite adduct with o-phenylenediamine.

References Cited

UNITED STATES PATENTS

| 3,478,046 | 11/1969 | Sarett et al. | 260—309.2 |
| 3,485,818 | 12/1969 | Thompson | 260—239 BC |

FOREIGN PATENTS

| 955,861 | 1/1957 | Germany | 260—309.2 |
| 713,133 | 8/1954 | Great Britain | 260—309.2 |
| 1,083,201 | 9/1967 | Great Britain | 260—309.2 |
| 1,138,058 | 10/1962 | Germany | 260—309.2 |

OTHER REFERENCES

Wright: Chem. Rev., vol. 48, pp. 434–9 relied on (1951).

Dunn et al.: J. Med. Chem., vol. 9, pp. 751–3 (1966).

NATALIE TROUSOF, Primary Examiner

U.S. Cl. X.R.

260—2 R, 72.5, 294.8 C, 304, 307 D, 309.2

UNITED STATES PATENT OFFICE
CERTIFICATE OF CORRECTION

Patent No. 3,772,309  Dated November 13, 1973

Inventor(s) MARVEL et al

It is certified that error appears in the above-identified patent and that said Letters Patent are hereby corrected as shown below:

In column 4, line 35, the structural formula should read:

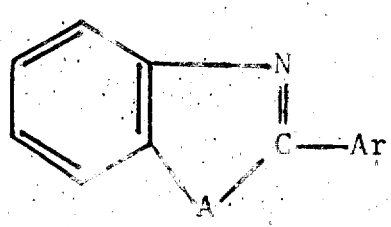

Signed and sealed this 23rd day of April 1974.

(SEAL)
Attest:

EDWARD M. FLETCHER, JR.
Attesting Officer

C. MARSHALL DANN
Commissioner of Patents